United States Patent
Hodgman

(10) Patent No.: US 11,811,812 B1
(45) Date of Patent: *Nov. 7, 2023

(54) CLASSIFICATION MODEL TO DETECT UNAUTHORIZED NETWORK BEHAVIOR

(71) Applicant: Rapid7, Inc., Boston, MA (US)

(72) Inventor: Roy Hodgman, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/540,074

(22) Filed: Dec. 1, 2021

Related U.S. Application Data

(63) Continuation of application No. 16/233,631, filed on Dec. 27, 2018, now Pat. No. 11,223,638.

(51) Int. Cl.
| | |
|---|---|
| *H04L 9/40* | (2022.01) |
| *H04L 67/306* | (2022.01) |
| *H04L 67/50* | (2022.01) |
| *G06F 18/2411* | (2023.01) |

(52) U.S. Cl.
CPC ...... *H04L 63/1425* (2013.01); *G06F 18/2411* (2023.01); *H04L 67/306* (2013.01); *H04L 67/535* (2022.05)

(58) Field of Classification Search
CPC . H04L 63/1425; H04L 67/535; H04L 67/306; G06F 18/2411
See application file for complete search history.

(56) References Cited

U.S. PATENT DOCUMENTS

| | | | |
|---|---|---|---|
| 8,607,349 B1 | 12/2013 | Zaitsev | |
| 9,519,682 B1 | 12/2016 | Pujara et al. | |
| 9,537,880 B1* | 1/2017 | Jones | H04L 63/1433 |
| 10,419,931 B1 | 9/2019 | Sohail et al. | |
| 10,592,978 B1 | 3/2020 | Vaystikh et al. | |
| 10,798,113 B2 | 10/2020 | Muddu et al. | |
| 2004/0162781 A1 | 8/2004 | Searl et al. | |
| 2014/0033307 A1 | 1/2014 | Schmidtler | |
| 2016/0094529 A1 | 3/2016 | Mityagin | |
| 2017/0085587 A1* | 3/2017 | Turgeman | G06F 21/32 |
| 2017/0093910 A1 | 3/2017 | Gukal et al. | |
| 2017/0193558 A1 | 7/2017 | Lyons et al. | |
| 2017/0279907 A1* | 9/2017 | Kita | G01P 13/00 |
| 2018/0102952 A1* | 4/2018 | Gopalakrishnan | H04L 43/04 |
| 2018/0103052 A1* | 4/2018 | Choudhury | H04L 63/20 |
| 2018/0205752 A1* | 7/2018 | Liu | H04L 63/1425 |
| 2018/0260244 A1* | 9/2018 | Ahmed | G06F 11/3006 |
| 2018/0303381 A1 | 10/2018 | Todd et al. | |
| 2019/0068627 A1 | 2/2019 | Thampy | |
| 2019/0236333 A1* | 8/2019 | Hsiung | G06V 20/698 |
| 2020/0051239 A1 | 2/2020 | Braun et al. | |
| 2020/0143046 A1* | 5/2020 | Rodriguez Bravo | G06F 21/316 |
| 2020/0382537 A1* | 12/2020 | Compton | H04L 41/145 |

* cited by examiner

*Primary Examiner* — Ghodrat Jamshidi
(74) *Attorney, Agent, or Firm* — Ashwin Anand

(57) ABSTRACT

Methods and systems for classifying network users. The system may receive a classification of a user account on a network and network activity data associated with the user account. Upon detecting a discrepancy between the expected behavior of the user account based on its classification and the present behavior of the user account, the system may obtain a corroborating result from one or more directory sources. An alert may then be issued based on the detected discrepancy and the corroborating result.

20 Claims, 4 Drawing Sheets

CLASSIFICATION MODEL TO DETECT UNAUTHORIZED NETWORK BEHAVIOR

This application is a continuation of U.S. patent Ser. No. 16/233,631, filed Dec. 27, 2018, which is hereby incorporated by reference herein in its entirety.

TECHNICAL FIELD

Embodiments described herein generally relate to systems and methods for classifying user accounts on a network.

BACKGROUND

Due to their prevalence in today's society, the internet and other types of networks have become hubs for criminal activity. Often times cyber-criminals or other threat actors attempt to install or otherwise deploy harmful applications on unprotected systems. Once a threat actor obtains access to a target system or device, they may perform further actions such as stealing data, escalating their privileges, or the like.

Accordingly, it may be desirable to know about the type of users on a network and their actions. There are several existing methods for classifying users. For example, interested parties such as security personnel may rely on values extracted from an Active Directory (e.g., values such as an employee's office location, manager, group, title, etc.) to monitor the employee's behavior on one or more networks.

While these existing solutions can initially classify users, they are generally unable to do so in a reliable and consistent manner. For example, Active Directory and other manually-curated directories can quickly become outdated. Additionally, these directories typically contain many attributes about users, and these attributes don't necessarily translate to behavioral attributes that can be used to monitor and classify users in a meaningful way.

A need exists, therefore, for systems and methods for classifying user accounts that overcome the disadvantages of existing techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for classifying user accounts on a network. The method includes receiving at an interface a first assigned classification for at least one user account on the network, wherein the first assigned classification indicates expected behavior of the at least one user account; receiving at the interface network activity data associated with the at least one user account, wherein the network activity data is indicative of present behavior of the at least one user account; detecting, using a processor executing instructions stored on a memory, a discrepancy between the expected behavior of the at least one user account and the present behavior of the at least one user account; corroborating, using the processor, the detected discrepancy with a directory source to obtain a corroborating result; updating, using the processor, at least one classification model based on the detected discrepancy and the corroborating result; and issuing an alert using a user interface upon detecting the discrepancy between the expected behavior of the at least one user account and the present behavior of the at least one account, wherein the issued alert is based on the corroborating result.

In some embodiments, the method further includes assigning a second classification to the at least one user account based on the detected discrepancy between the expected behavior of the at least one user account and the present behavior of the at least one user account and based on the corroborating result.

In some embodiments, the present behavior of the at least one user account includes at least one of timing of user account authentications, from where the at least one user account authenticates, devices used by the at least one user account, network traffic associated with the at least one user account, and software on devices used by the at least one user account.

In some embodiments, the directory source includes at least one of an active directory and a payroll directory.

In some embodiments, the at least one classification model includes at least one of a random forest-based classifier and a support vector machine-based classifier.

In some embodiments, the at least one classification model includes a classification model configured to classify the at least one user account into one of a plurality of classes.

In some embodiments, the at least one classification model includes a plurality of binary classification models that are each configured to classify the at least one user account with respect to a different class.

In some embodiments, the method further includes updating the at least one classification model upon detecting a discrepancy between expected behavior of a plurality of user accounts and present behavior of a plurality of user accounts.

According to another aspect, embodiments relate to a system for classifying user accounts on a network. The system includes an interface for at least receiving a first assigned classification for at least one user account on the network, wherein the first assigned classification indicates expected behavior of the at least one user account, and network activity data associated with the at least one user account, wherein the network activity data is indicative of present behavior of the at least user account; a processor executing instructions on a memory to detect a discrepancy between the expected behavior of the at least one user account and the present behavior of the at least one user account, corroborate the detected discrepancy with a directory source to obtain a corroborating result, and update at least one classification model based on the detected discrepancy and the corroborating result; and a user interface configured to issue an alert using a user interface upon detecting the discrepancy between the expected behavior of the at least one user account and the present behavior of the at least one account, wherein the issued alert is based on the corroborating result.

In some embodiments, the processor is further configured to assign a second classification to the at least one user account based on the corroborating result and the detected discrepancy between the expected behavior of the at least one user account and the present behavior of the at least one user account.

In some embodiments, the present behavior of the at least one user account includes at least one of timing of user account authentications, from where the at least one user account authenticates, devices used by the at least one user account, network traffic associated with the at least one user account, and software on devices used by the at least one user account.

In some embodiments, the directory source includes at least one of an active directory and a payroll directory.

In some embodiments, the at least one classification model includes at least one of a random forest-based classifier and a support vector machine-based classifier.

In some embodiments, the at least one classification model includes a classification model configured to classify the at least one user account into one of a plurality of classes.

In some embodiments, the at least one classification model includes a plurality of binary classification models that are each configured to classify the at least one user account with respect to a different class.

In some embodiments, the processor is further configured to update the at least one classification model upon detecting a discrepancy between expected behavior of a plurality of user accounts and present behavior of a plurality of user accounts.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
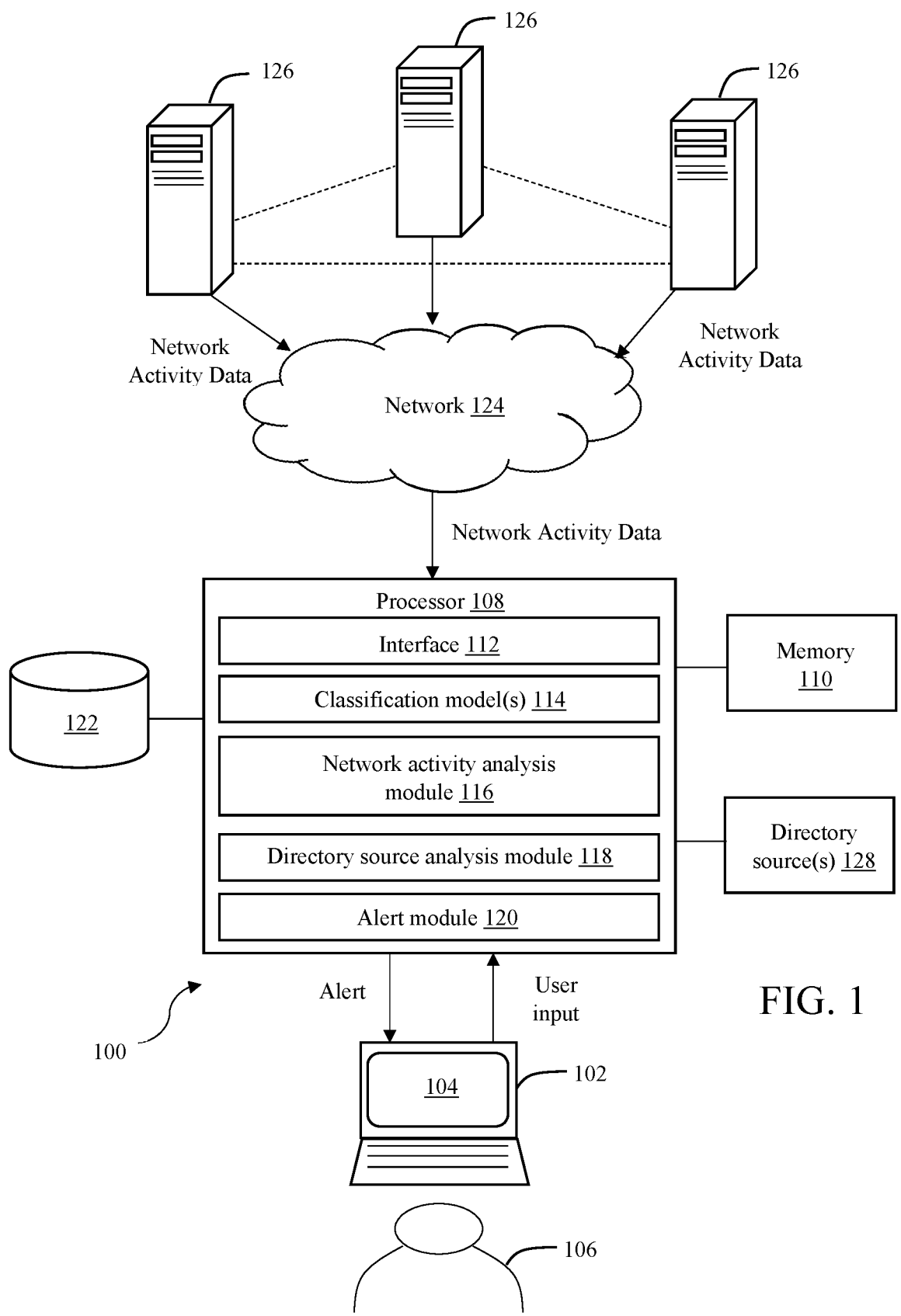
FIG. 1 illustrates a system for classifying user accounts on a network in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The systems and methods described herein provide novel techniques for classifying users and monitoring their behavior on one or more networks. To join a company's local area network (LAN) or other type of network, users are generally required to provide credentials (e.g., a username and password) to use a designated user account. Once the user joins a network, their actions on the network are attributed to their user account. In other words, a human user and their actions may be associated with a user account.

The systems and methods described herein may monitor user accounts and their behavior on one or more networks. Additionally, the systems and methods described herein may classify or group similar users and user accounts together based on common or otherwise similar network behavior.

These classifications may suggest expected behavior for user accounts as well. For example, user accounts classified as "developers" may be expected to behave differently than user accounts classified as "finance" or "human resources." However, it is expected that a user account classified as a developer will behave similarly to other user accounts classified as developers.

Based on the classification and the expected behavior of a user account, it is possible to detect when a user account switches classifications or otherwise exhibits unusual or anomalous behavior. One of the primary purposes for detecting these changes in user account behavior is to identify when a user's account has potentially been taken over by a threat actor.

Another purpose for detecting changes in user account behavior is to identify when a user has intentionally modified their behavior. This intentional change may indicate malicious activity (such as stealing data or causing havoc before leaving a company), or may be the result of a promotion or other legitimate change in the user's life.

The systems and methods described herein therefore achieve stable and reliable classifications, even when considering different inputs from different time periods. Consider a comparison to a biometric authenticator such as a voiceprint analysis tool. A system that uses voiceprints to authenticate a user needs to reliably authenticate a voice sample as belonging to a particular user whenever the user attempts to authenticate.

If the user is tired, intoxicated, sick, speaking into a bad microphone, speaking in a place with background noise, on a low bandwidth voice-over-internet-protocol (VOIP) connection with significant compression, etc., the voiceprint provided by the user will necessarily be different from a voiceprint provided under normal circumstances. The authentication tool should nonetheless be able to receive input of varying quality and still provide the correct output. In these scenarios, the output would be a decision that the user is who they claimed to be or, and possibly more importantly, that the user is not who the user claims to be.

FIG. 1 illustrates a system 100 for classifying user accounts on a network in accordance with one embodiment. The system 100 may include a user device 102 executing a user interface 104 accessible by a user 106. The user interface 104 may allow a user 106 such as security personnel to view data regarding activity on a network.

The user interface 104 may also issue alerts to inform the user 106 of anomalous activity. The user 106 may then review any data associated with the alert (e.g., the data that caused the alert to be issued) and perform any appropriate action(s).

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106.

The user device 102 may be in operable communication with one or more processors 108. The processor(s) 108 may be any hardware device capable of executing instructions stored on memory 110 to accomplish the objectives of the various embodiments described herein. The processor 108 may be a microprocessor, a field programmable gate array (FPGA), an application-specific integrated circuit (ASIC), or other similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located at some remote location.

The processor 108 may execute instructions stored on memory 110 to provide various modules to accomplish the features of various embodiments described herein. Specifically, the processor 108 may execute or otherwise include an interface 112, one or more classification models 114, a network activity analysis module 116, a directory source analysis module 118, and an alert module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for monitoring network activity can be executed by the processor 108 to accomplish the features of various embodiments described herein.

The processor 108 may execute instructions stored on memory 110 and rely on data stored in the database(s) 122 to monitor activity on one or more networks 124 including one or more network devices 126. The network(s) 124 may link the various devices with various types of network connections. The network(s) 124 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 124 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

The processor 108 may also be in communication with one or more directory sources 128. The directory source(s) 128 may provide additional insight regarding the users/user accounts. For example, in some embodiments, the directory source(s) 128 may include an Active Directory intended to keep track of an employee's position/title, user device information, security clearance level, authorization privileges, office location, or the like. Similarly, the directory source(s) 128 may include payroll-related documentation comprising data regarding a particular user's salary, position, title, work history, etc.

The network devices 126 may include any device that communicates on one or more networks 124. These may include, but are not limited to, computers, laptops, routers, firewalls, servers, phones, or otherwise any type of device that can monitor and provide data indicative of user account behavior.

In operation, the system 100 may first classify user accounts into groups. If there is a predefined set of groups to which each user on a network 124 should belong, security personnel may classify these users into these groups in order to bootstrap a training dataset. For example, a network for a certain company may include a developer group, an accounting group, a management group, a finance group, a security group, and a manufacturing group. This list of groups is merely exemplary, and other groups in addition to or in lieu of those mentioned above may be considered in accordance with the various embodiments described herein.

Based on these initial classifications, the processor 108 may then derive one or more classification models for the defined groups. For example, the processor 108 may generate a single classification model to classify a user account as belonging to one of the above-mentioned groups.

Additionally or alternatively, the processor 108 may generate multiple classification models, wherein each generated model is a binary classification model configured to determine whether a user account belongs to a certain group. For example, a developer group classification model may determine whether a user account should (or should not) be classified as a developer, a finance group classification model may determine whether a user account should (or should not be) classified as a finance group employee, etc. In these embodiments, the models may output a binary classification decision (yes/no) as to whether a user account should be classified as a member of its respective group.

In some embodiments, the model(s) may be random forest-based models that output a classification decision based on the derivation of features related to a given user account's behavior. This behavior may relate to how often a user authentications, when they authenticate, from where they authenticate, the types of device(s) used, high level summaries of incoming and outgoing traffic, software executing on the user's device(s), or the like.

Random forest-based classification models tend to work well for these types of classifications as they are quick and provide feedback regarding which features provide high classification value. That is, they provide feedback about which features can map users into groups in meaningful ways and can classify users into the correct groups.

Figure 2:
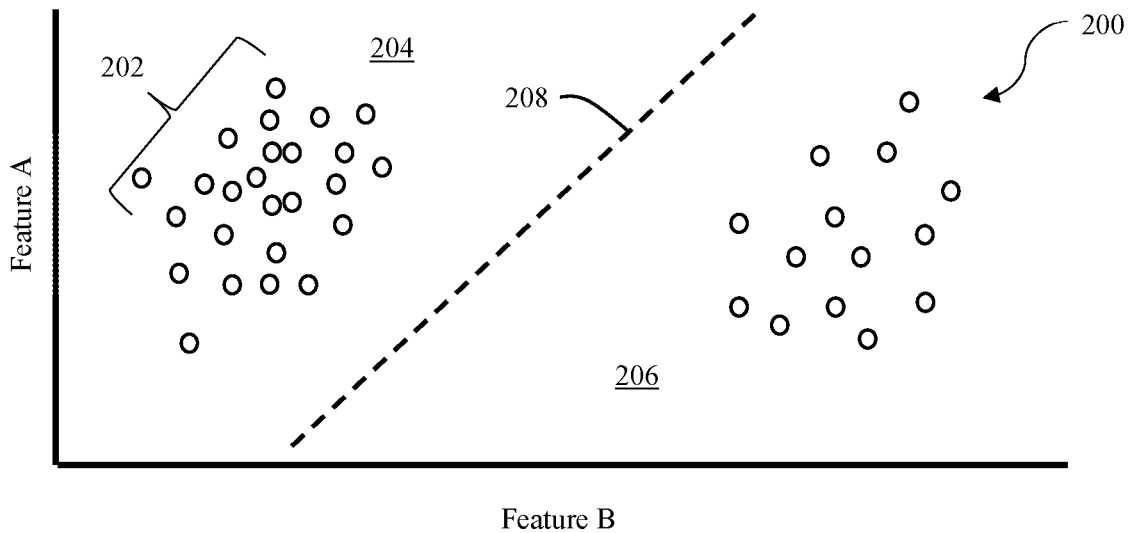
FIG. 2 illustrates a support vector machine classifier in accordance with one embodiment.

The processor 108 may additionally or alternatively use support vector machine (SVM)-based classifiers. FIG. 2, for example, illustrates an SVM classifier 200 in accordance with one embodiment. The SVM classifier 200 illustrates a plurality of user accounts 202 (illustrated as circles) that are sorted into groups 204 and 206 separated by a decision boundary 208. The determination of which group 204 or 206 to which a user account 202 belongs may depend on the presence of one or more features A and B related to the behavior of the user account 202.

For example, user accounts 202 classified in group 204 (i.e., the left side of the decision boundary 208) may possess some feature or combination of features that the user accounts 202 classified into group 206 do not. The SVM classifier 200 of FIG. 2 may be configured to classify user accounts 202 in a variety of ways. For example, classification group 204 may correspond to user accounts that are developers, and classification group 206 may correspond to user accounts that are specifically in a company's finance department. Or, classification group 204 may correspond to user accounts that are developers, and classification group 206 may correspond to user accounts that are not developers.

In some embodiments, the processor 108 may execute a combination of different types of classifiers or modules to accomplish the features of various embodiments described herein. For example, random forest models may experiment with various sets of features to identify which features are useful and of high value, and then use datasets that include those features to train other types of models.

Accordingly, the processor 108 may train the classification model(s) 114 in a supervised fashion. The processor 108 may also perform any appropriate testing procedure on data for validation. For example, the processor 108 may perform k-fold cross validation techniques to test the generated models on the received data or any other type of procedure to test the trained model(s) on held out data.

In some applications, there may not be a preconceived set of groups into which users should be classified. In these instances, the systems and methods described herein may execute instructions stored in memory 110 to perform procedures such as the Elbow Method to find the optimal number of groups such that the generated groups are sufficiently distinct while the members of a particular group are meaningfully similar.

Once the classification model(s) are trained, groups defined, and user accounts classified, the systems and methods described herein may consider in real time network activity data associated with one or more user accounts. Network activity data associated with one or more user accounts may be received at the interface 112.

The network activity analysis module 116 may then analyze the received network activity with respect to one or more features indicative of a user account's behavior. As discussed previously, this data may include, but is not limited to, how often a user authenticates, when they authenticate, from where they authenticate, the types of device(s) used, high level summaries of incoming and outgoing traffic, software executing on the user's device(s), or the like. This list of activity data is merely exemplary and other types of data in addition to or in lieu of the data described above may be used to accomplish the features of various embodiments described herein.

The network activity analysis module 116 may analyze these features over a given time interval (e.g., over a single day or multiple days) to determine if a user account exhibits behavior that suggests its classification has changed. For example, the network activity analysis module 116 may detect that a certain user account has authenticated/logged on to a network at a time that is unusual or otherwise different from the time the user account is expected to authenticate/log on to a network. In other words, the network activity analysis module 116 may detect a discrepancy between the expected behavior of a user account and the present behavior of the user account.

Figure 3:
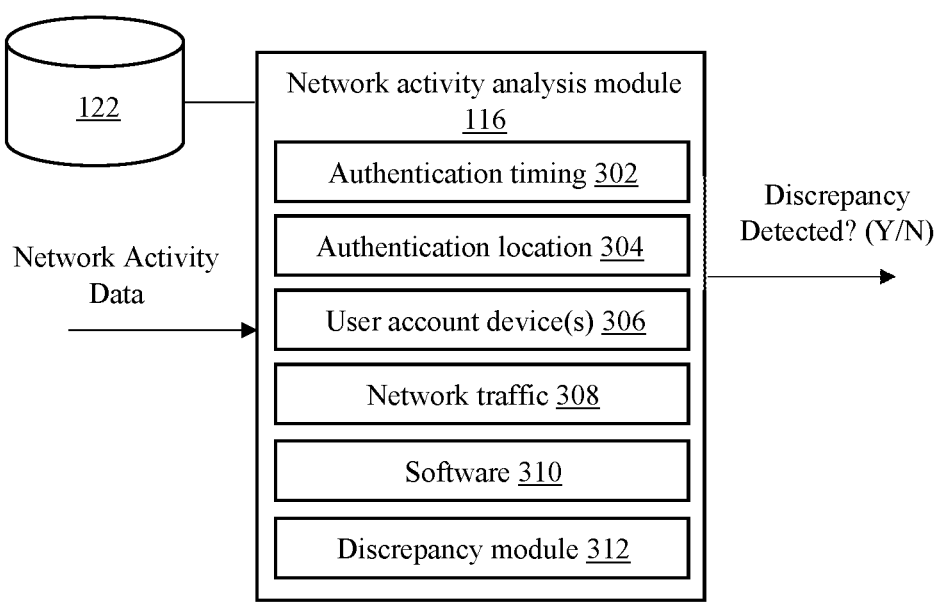
FIG. 3 illustrates the network activity analysis module of FIG. 1 in accordance with one embodiment.

FIG. 3 illustrates the network activity analysis module 116 in accordance with one embodiment. The network activity analysis module 116 may include various components or modules 302-12 to analyze the received network activity data. For example, the network activity analysis module 116 may include an authentication timing module 302, an authentication location module 304, a user account device(s) module 306, a network traffic module 308, a software analysis module 310, and a discrepancy module 312.

The authentication timing module 302 may analyze data regarding when a particular user account authenticates to or otherwise logs on to a network. For example, it may be common for developers to log on to a network at 9:00 AM on weekday mornings. It may be common for user accounts associated with other groups to log on to a network at different times, however. Data regarding the normal or otherwise expected timing of authentication for a particular group may be stored in one or more databases 122.

Accordingly, the authentication timing module 302 may analyze the present timing of authentication(s) for a user account against the expected timing of authentications for user accounts of that particular classification. The authentication timing module 302 may consider each authentication in isolation and/or consider the average timing of authentications for a particular user account over a period of time such as over a week. These may be simple averages, weighted averages, etc.

Based on this analysis, the authentication timing module 302 may detect a discrepancy between the expected authentication timing of a user account and the present authentication timing. This discrepancy may indicate or at least suggest that the user account has switched classification groups or is otherwise behaving in a way that is anomalous and potentially warrants further investigation.

The authentication location module 304 may consider data regarding from where user accounts authenticate. Data regarding the expected authentication locations of user accounts associated with particular classifications may be stored in and received from one or more databases 122.

For example, it may be expected that user accounts of a certain classification may authenticate from an area that corresponds to a company's headquarters. User accounts associated with a different classification may be expected to authenticate from different locations. As another example, if employees occasionally work from home, it may be expected they nonetheless authenticate within a defined radius from a company's office building.

Based on this analysis, the authentication location module 304 may detect a discrepancy between the expected authentication location of a user account and the present authentication location. This discrepancy may indicate or at least suggest that a user account has switched classification groups or is otherwise behaving in a way that is anomalous and potentially warrants further investigation.

The user account device(s) module 306 may analyze the device(s) used by a user account. A user account on a company's network may be assigned a particular user device. For example, a user associated with a user account may be assigned one or more of a laptop, PC, tablet, smartphone, etc. for use in fulfilling their employment duties. Accordingly, the database 122 may store data regarding user accounts and their associated device(s).

In operation, therefore, the user account device(s) module 306 may detect a discrepancy between the user device(s) a user account is expected to use and the user device(s) a user account actually uses. This discrepancy may indicate or at least suggest that a user account has switched classification groups or is otherwise behaving in a way that is anomalous and potentially warrants further investigation.

The network traffic module 308 may analyze data regarding the incoming and/or outgoing traffic associated with a user account. Data regarding the average amount of incoming data sent to a user account may be stored in the one or more databases 122, as well as data regarding the average amount of outgoing data sent from a user account. For example, the database(s) 122 may store data about the amount of data a user account is expected to send at a given time or within a given time window. The timing of this traffic may be considered as well.

Network traffic data that indicates an extremely high amount of data output relative to what is expected may suggest that a threat actor has obtained access to a user account and is exfiltrating data. Accordingly, this discrepancy may indicate or at least suggest that a user account has switched classification groups or is otherwise behaving in a way that is anomalous and potentially warrants further investigation.

The software module 310 may analyze the type of software executing on a user device used by a user account. Data regarding the expected software (e.g., version) may be stored in the one or more databases 122. If the software module 310 detects software on a user device that is different than what is expected, this discrepancy may indicate or at least suggest that a user account has switched classification groups or is otherwise behaving in a way that is anomalous and potentially warrants further investigation.

The discrepancy module 312 may analyze the output from one or more of the various modules 302-10 in a variety of ways to determine if the network activity data as a whole indicates a user account has switched classifications. For example, the discrepancy module 312 may output a decision that the user account has switched classifications only if two or more of the modules 302-10 provide a "vote" that their associated analysis indicates the user account has switched classifications.

The sensitivity of the discrepancy module 312 may be adjusted and may depend on the network, the device(s) on the network, the company hosting the network, or the like. For example, some applications may be less sensitive to malicious activity and require all five modules 302-10 to output a "vote" that their associated data indicates a user account is behaving in a way that indicates or at least suggests its classification has changed. Other, more sensitive applications may require only one or more of the modules 302-10 to output a classification-change vote before the discrepancy module 312 outputs a decision that a user account has changed classification.

In some embodiments, a stronger showing of one or more pieces of activity data may make up for a lesser showing of one or more other pieces of data. For example, in a given instance the average timing of authentication may be only slightly different than what is expected. However, the location from which the user account authenticates may be extremely different than what is expected such that the discrepancy module 312 ultimately decides that the combination of the different types of data suggests the activity is anomalous and warrants further investigation.

The modules 302-10 and the data considered thereby are merely exemplary. The network activity analysis module 116 may consider other types of data in addition to or in lieu of the data described above as long as it can accomplish the features of the various embodiments described herein.

Referring back to FIG. 1, the directory source analysis module 118 may consult one or more directory source(s) 128 to confirm its output that a user account has switched classifications and warrants further investigation. For example, the network activity analysis module 116 may have detected that a user account has suddenly started remotely logging on to the network 124 from a new location. This may be a cause for concern as it could indicate that someone not legitimately associated with the user account (and perhaps from a different country) has maliciously obtained access to the user account. However, this sudden change may be due to a completely legitimate reason, such as the user associated with the user account being given the ability to work from home.

In the latter scenario, an alert informing the user 106 of this detected change would be a false positive as the reason for the change is legitimate. Accordingly, to ensure the alert module 120 does not issue a false positive, the directory source analysis module 118 may consult or otherwise receive data from the directory source(s) 128 to obtain a corroborating result. The directory source 128 may include an Active Directory of a company's employees that includes data such as employee department, office location, credentials, usernames, title, authorizations, or the like. In some embodiments, the directory source(s) 128 may include payroll documentation. These types of directory sources are merely exemplary and other types of directories may be used to provide additional data that provides context to the output of the network activity analysis module 116.

In the scenario described above, the directory source(s) 128 may indicate that the particular user account has indeed been authorized to work from home. The directory source(s) 128 may also include data regarding the employee's address to confirm that the user account is in fact authenticating from their home location. Accordingly, in this instance, the alert module 120 would not issue an alert to the user 106.

However, if the directory source 128 does not include data that suggests the user account should be authenticating from a different location (i.e., the detected location of authentication), then the alert module 120 may issue an alert to the user 106. The issued alert may be presented as a visual alert, an audio-based alert, a text-based alert, a haptic-based alert, or some combination thereof. The user 106 may then be inclined to investigate the particular user account and take any necessary remedial or mitigation steps.

For example, the user 106 may freeze, lock out, or otherwise disable the user account from future activity on the network 124. Alternatively, the processor 108 may autonomously take these types of actions to prevent a threat actor from using the user account to perform further malicious acts.

Based on the output of the analysis, the processor 108 may update the classification model(s) 114 and the data stored in the one or more databases 122 to improve future classifications. For example, data regarding a user account such as privileges and/or new devices may be noted so that future authentications from new locations or with new devices will not be flagged as suspicious.

Figure 4A:
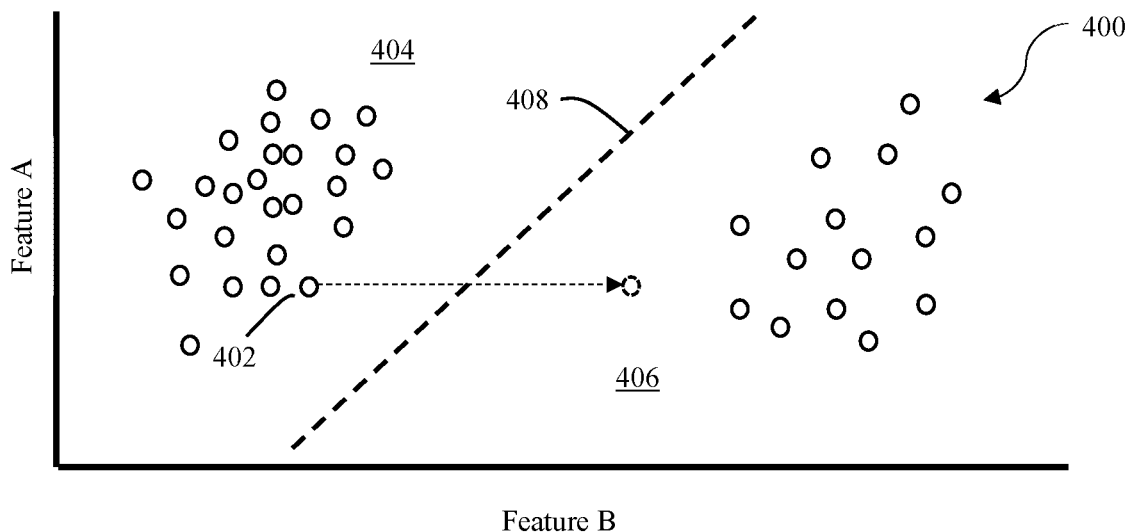
FIGS. 4A-B illustrate a support vector machine classifier in accordance with another embodiment.

In some embodiments, the features associated with a particular classification definition may change based on changes to user account behavior that appear across a plurality of user accounts. For example, FIG. 4A shows an SVM classifier 400 that is similar to the classifier 200 of FIG. 2. As seen in FIG. 4A, user account 402 is initially associated with classification 404. Also shown in FIG. 4A is a second classification 406 separated from classification 404 by decision boundary 408.

User account 402 may initially exhibit behavioral features indicative of classification 404. However, the systems and methods described herein may detect that the user account 402 suddenly exhibits behavior that is instead associated with classification 406.

Figure 4B:
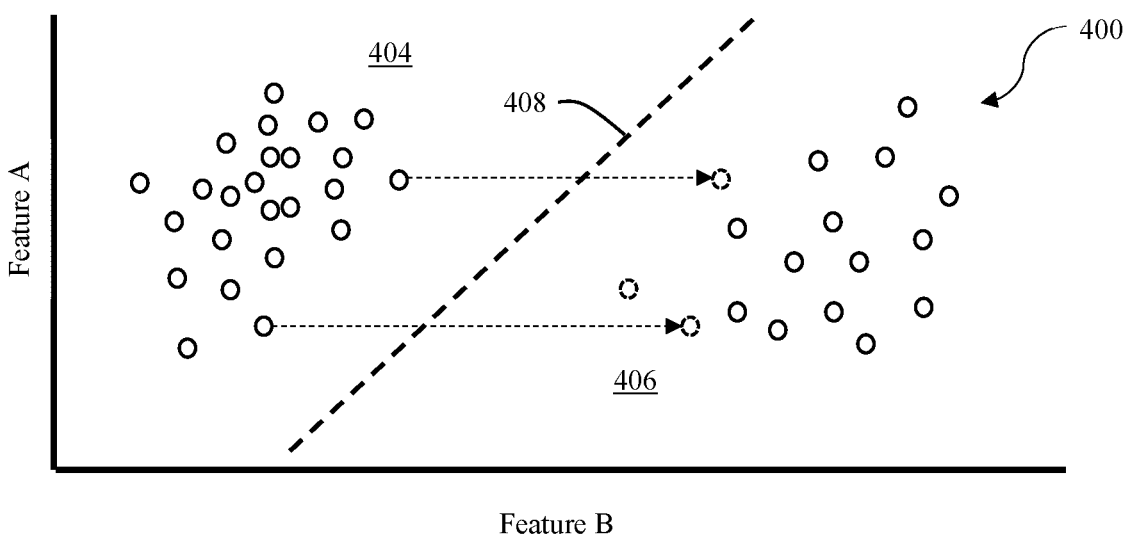

This may be indicative of anomalous behavior and, notwithstanding a corroborating result to the contrary, may warrant investigation. FIG. 4B, however, shows the SVM classifier 400 of FIG. 4A detecting additional user accounts that begin exhibiting the same behavior as account 402 that is associated with or otherwise indicative of classification 406.

The systems and methods described herein may therefore recognize that multiple user accounts suddenly exhibit new behavior. The systems and methods described herein may, based on these common changes, update the user accounts' classifications and/or the qualifications or features that define a classification. In performing these steps, the systems and methods may also consider corroborating results based on one or more directory sources. Accordingly, the systems and methods described herein may update the classification model(s) used and the analyses performed to more accurately classify user accounts and detect changes in user account behavior.

Figure 5:
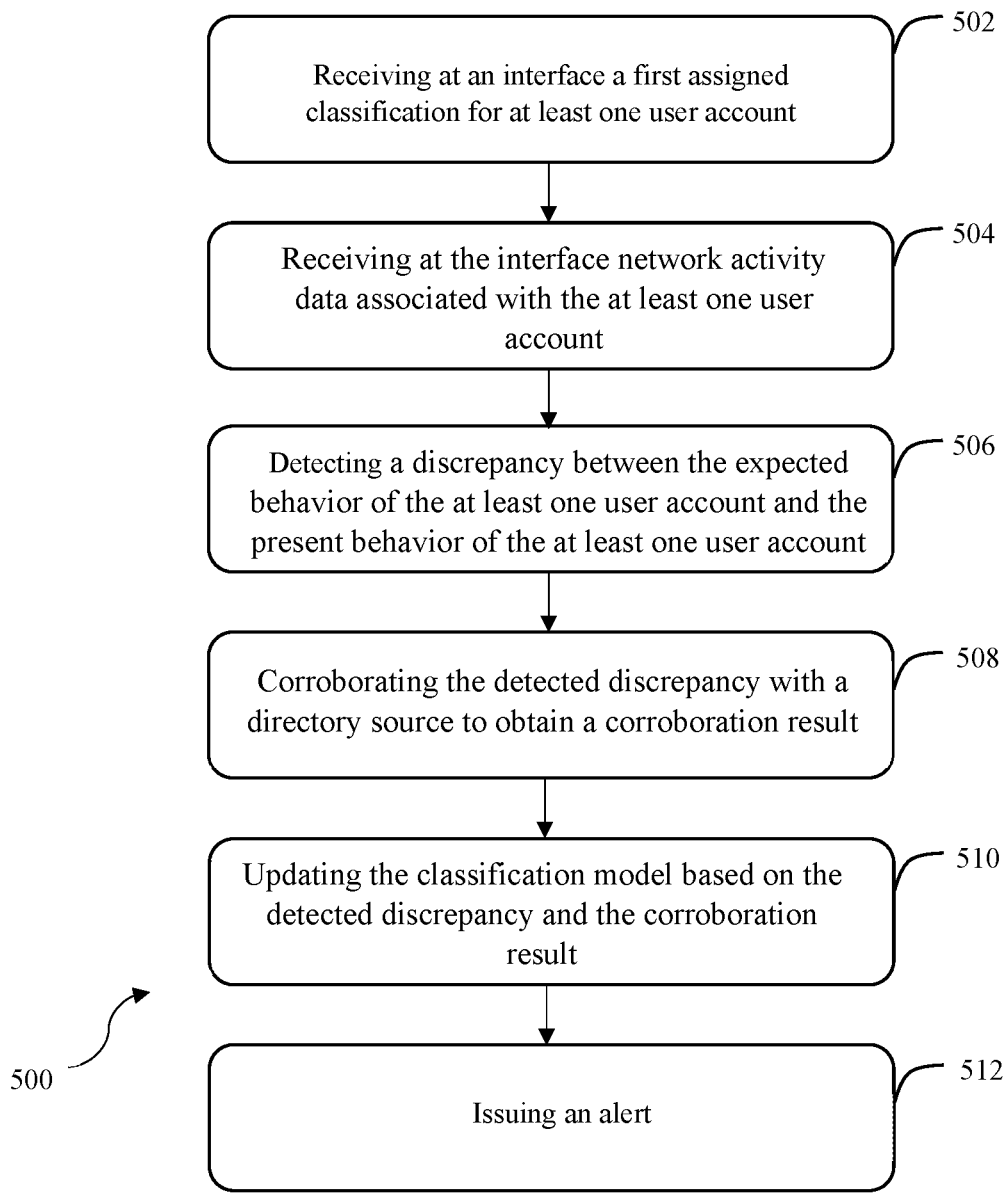
FIG. 5 depicts a flowchart of a method for classifying user accounts on a network in accordance with another embodiment.

FIG. 5 depicts a flowchart of a method 500 for classifying user accounts on a network in accordance with one embodiment. Step 502 involves receiving at an interface a first assigned classification for at least one user account on the network, wherein the first assigned classification indicates expected behavior of the at least one user account.

Classifications regarding user accounts may be stored in one or more databases. For example, employee "John Doe" may have a user account represented by the user name "john doe" and may be classified as an employee in a company's finance department. Accordingly, if security personnel were to query a database for this particular employee, they may receive the employee's user name and their classification.

Step 504 involves receiving at the interface network activity data associated with the at least one user account, wherein the network activity data is indicative of present behavior of the at least one user account. In addition to receiving a particular employee's classification, security personnel or other interested and authorized parties may receive network activity data associated with the user account.

The received network activity data may relate to how a user account interacts with other devices on a network and particular actions carried out by the user account. For example, this behavior may relate to at least one of the timing of user account authentications, from where the at least one user account authenticates, devices used by the at least one user account, network traffic associated with the at least one user account, and software on devices used by the at least one user account.

Step 506 involves detecting, using a processor executing instructions stored on a memory, a discrepancy between the expected behavior of the at least one user account and the present behavior of the at least one user account. As discussed previously, the user account may be expected to behave in certain ways depending on its classification. For example, the user account may be expected to authenticate and log on to a network on certain days and at certain times.

Accordingly, the processor may detect any discrepancies between the expected behavior of the user account and the behavior that the user account is actually exhibiting. The processor may be configured to tolerate some deviations with respect to present behavior that is different than what is expected before classifying the difference as an actual, meaningful discrepancy.

For example, a particular user account may be expected to log on to a network at 9:00 AM each morning. If the user account logs on to the network at 9:04 AM, the network activity analysis module may consider this authentication time as "close enough" to the expected time such that it still falls within the categorization of expected behavior and is not recognized as a discrepancy. These types of tolerances may be configured by users such as security personnel and may depend on the application.

Step 508 involves corroborating, using the processor, the detected discrepancy with a directory source to obtain a corroborating result. A directory source may be an Active Directory or payroll-related documentation, for example.

As discussed previously, oftentimes a user account may behave in a manner that is unexpected but there is a legitimate reason for the discrepancy. For example, a user associated with a particular user account may normally authenticate from a certain location such as a company's headquarters, but suddenly authenticates from a new location. However, this particular user may have recently moved and is logging in from a new location (e.g., a new residential address, a different office location, etc.).

However, in other instances, there may be no legitimate reason as to why the user account is behaving differently than what is expected. For example, there may be no reason as to why a user account authenticates from a foreign country during early morning hours on a weekend. Accordingly, in this instance, the corroborating result would indicate that the detected discrepancy between the expected behavior and the present behavior suggests the user account has switched classifications or is otherwise acting in a way that is anomalous and warrants further investigation.

Step 510 involves updating, updating the processor, at least one classification model based on the detected discrepancy and the corroborating result. For example, the processor may update at least one classification model to note that a user account associated with a particular classification has exhibited anomalous behavior that is not justified by the corroborating result. Accordingly, in the future, the classification model may continue to rely on a particular feature as definitive or at least indicative of a particular classification.

Step 512 involves issuing an alert using a user interface upon detecting the discrepancy between the expected behavior of the at least one user account and the present behavior of the at least one account, wherein the issued alert is based on the corroborating result. In other words, if the corroborating result indicates that the user account has switched classifications or is otherwise acting anomalous in a way that is not justified, the processor may issue an alert using a user interface to inform a user of the detected discrepancy. As discussed previously, the alert may be a visual-based alert, an audio-based alert, a text-based alert, a haptic-based alert, or some combination thereof.

A user such as a security personnel and/or the system may then autonomously take any appropriate mitigation or remedial steps. For example, the system may autonomously restrict the user account from any further network access. Or, the system may direct all future communications from the user account to a virtual security appliance such as a honeypot.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
performing, by one or more computing devices:
receiving network activity data associated with a user account on a network, wherein the network activity data is indicative of behavior of the user account on the network;
obtaining, from a classification model, a first classification of the user account, wherein the first classification indicates expected behavior of the user account on the network;
detecting a discrepancy, indicative of unauthorized behavior, between the expected behavior of the user account indicated by the first classification from the classification model and the behavior of the user account;
determining, based on a response from a directory source distinct from the classification model, that the behavior is authorized behavior, wherein the determination avoids issuance of a false positive alert of unauthorized behavior for the discrepancy; and
updating, based on the determination, the classification model or the expected behavior indicated by the first classification, so that future instances of the behavior by the user account are not flagged as unauthorized behavior.

2. The method of claim 1, wherein
the expected behavior of the user account includes at least one of timing of user account authentications, one or more locations from where the user account authenticates, one or more devices used by the user account, timing or amount of network traffic sent or received by the user account, and software on one or more devices used by the user account.

3. The method of claim 1, wherein
the directory source includes at least one of an active directory and a payroll directory.

4. The method of claim 1, wherein
the classification model includes at least one of a random forest-based classifier and a support vector machine-based classifier.

5. The method of claim 1, wherein
the first classification model indicates a user group to which the user account belongs.

6. The method of claim 5, wherein
the detecting of the discrepancy includes determining that the user group determined using the classification model is different from an actual user group of the user account stored in a database.

7. The method of claim 1, wherein
the detecting of the discrepancy is made based on a vote of multiple modules that analyze different aspects of the behavior of the user account.

8. The method of claim 1, wherein
the determining that the behavior is authorized behavior includes determining from the directory source that the user account is associated with a new location, a new device, or a new user group.

9. The method of claim 1, wherein
the one or more computing devices implement a network monitoring system,
the network is a client network monitored by the network monitoring system, and
the network activity data is received via the Internet.

10. The method of claim 1, further comprising performing, by the one or more computing devices:
obtaining, from the classification model, a second classification of a second user account on the network;
detecting a second discrepancy between behavior of the second user account on the network and an expected behavior of the second user account as indicated by the second classification;
corroborating, based on the directory source, that the behavior of the second user account is anomalous behavior; and
generating an alert indicating the second user account and the anomalous behavior.

11. The method of claim 1, further comprising performing, by the one or more computing devices:
obtaining, from the classification model, a second classification of a second user account on the network;
detecting a second discrepancy between behavior of the second user account on the network and an expected behavior of the second user account as indicated by the second classification;
corroborating, based on the directory source, that the behavior of the second user account is anomalous behavior; and
generating an alert indicating the second user account and the anomalous behavior.

12. The method of claim 11, further comprising performing, by the one or more computing devices, one or more mitigation or remedial actions in response to the corroborating of the anomalous behavior, including one or more of freezing the second user account, disabling the second user account, and restricting network access of the second user account.

13. A system comprising:
a network monitoring system implemented by one or more computing devices, configured to:
receive network activity data associated with a user account on a network, wherein the network activity data is indicative of behavior of the user account on the network;
obtain, from a classification model, a first classification of the user account, wherein the first classification indicates expected behavior of the user account on the network;
detect a discrepancy, indicative of unauthorized behavior, between the expected behavior of the user account indicated by the first classification from the classification model and the behavior of the user account;
determine, based on a response from a directory source distinct from the classification model, that the behavior is authorized behavior, wherein the determination avoids issuance of a false positive alert of unauthorized behavior for the discrepancy; and
update, based on the determination, the classification model or the expected behavior indicated by the first classification, so that future instances of the behavior by the user account are not flagged as unauthorized behavior.

14. The system of claim 13, wherein
the network is a client network monitored by the network monitoring system; and
the network activity data is received via the Internet.

15. The system of claim 13, wherein
the directory source includes at least one of an active directory and a payroll directory.

16. The system of claim 13, wherein the classification model includes at least one of a random forest-based classifier and a support vector machine-based classifier.

17. The system of claim 13, wherein the classification model includes a plurality of binary classification models.

18. The system of claim 13, wherein the first classification model indicates a user group to which the user account belongs.

19. The system of claim 13, wherein the response from the directory source indicates that the user account is associated with a new location, a new device, or a new user group.

20. One or more non-transitory computer-readable media storing program instructions that when executed no one or more processors of one or more computing devices, cause the one or more processors to:

receive network activity data associated with a user account on a network, wherein the network activity data is indicative of behavior of the user account on the network;

obtain, from a classification model, a first classification of the user account, wherein the first classification indicates expected behavior of the user account on the network;

detect a discrepancy, indicative of unauthorized behavior, between the expected behavior of the user account indicated by the first classification from the classification model and the behavior of the user account;

determine, based on a response from a directory source distinct from the classification model, that the behavior is authorized behavior, wherein the determination avoids issuance of a false positive alert of unauthorized behavior for the discrepancy; and update, based on the determination, the classification model or the expected behavior indicated by the first classification, so that future instances of the behavior by the user account are not flagged as unauthorized behavior.

* * * * *